E. R. DARLING.

CARTRIDGE IMPLEMENT.

No. 10,421. - Reissued Dec. 11, 1883.

Witnesses.

Arthur Lipperden

John F. C. Preinkert

Inventor

Edmund R. Darling.

by Crosby & Gregory attys.

N. PETERS. Photo-Lithographer, Washington, D. C.

UNITED STATES PATENT OFFICE.

EDMUND R. DARLING, OF WOONSOCKET, RHODE ISLAND.

CARTRIDGE IMPLEMENT.

SPECIFICATION forming part of Reissued Letters Patent No. 10,421, dated December 11, 1883.

Original No. 272,215, dated February 13, 1883. Application for reissue filed October 17, 1883.

*To all whom it may concern:*

Be it known that I, EDMUND R. DARLING, of Woonsocket, in the county of Providence and State of Rhode Island, have invented a new and Improved Instrument for Capping, Decapping, Loading, and Extracting Cartridge-Shells, of which the following is a full, clear, and exact description.

My invention consists in an improved instrument adapted for use in capping, loading, and extracting shells, also for removing the caps from the shells, the construction of this combination-instrument being as hereinafter described and claimed.

Reference is to be had to the accompanying drawings, forming part of this specification, in which similar letters of reference indicate corresponding parts in all the figures.

Figure 1:
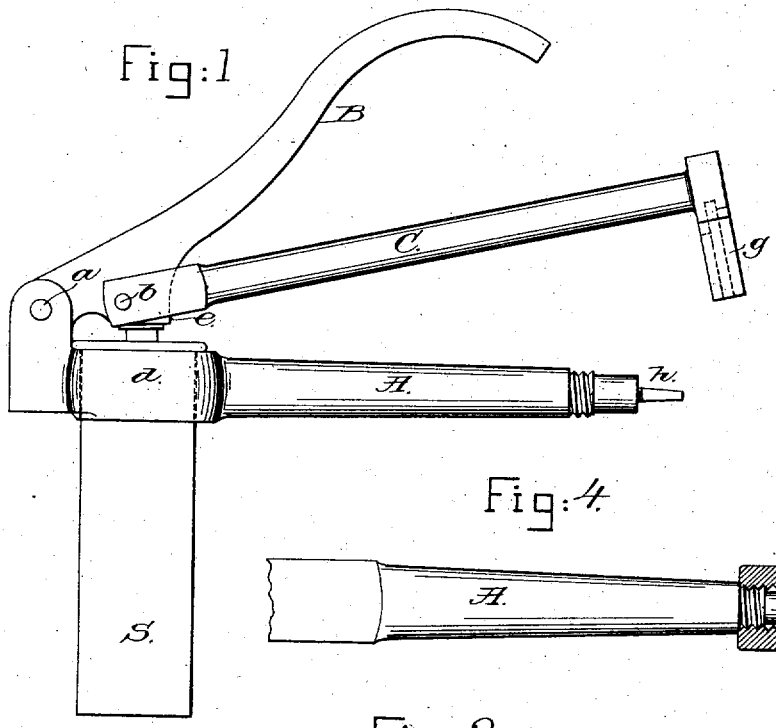
Figure 4:
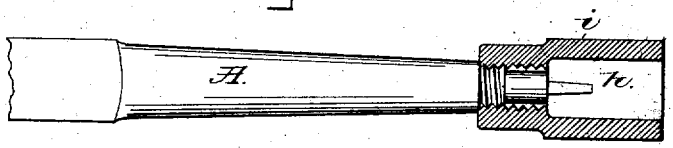
Figure 2:
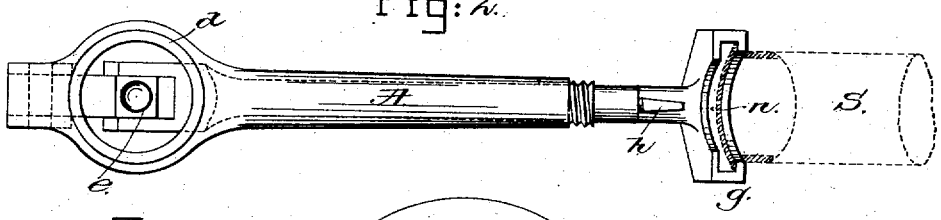
Figure 3:
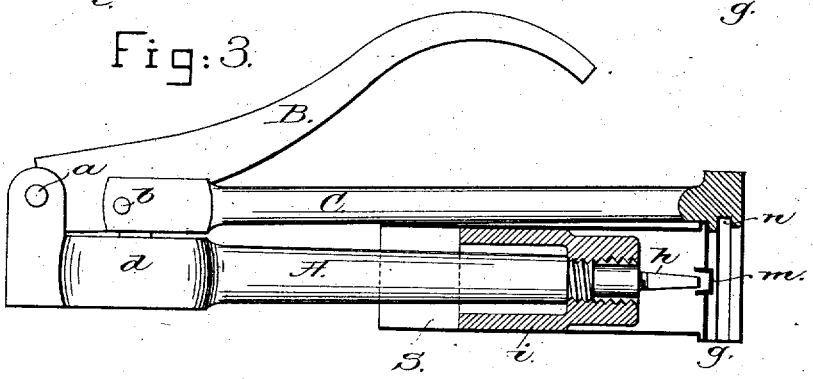

Figure 1 is a side view of the instrument, shown in the position of use for capping a shell. Fig. 2 is an inverted plan view of the same as applied for extracting a shell. Fig. 3 is a sectional side view of the instrument in position of use for decapping. Fig. 4 is a sectional view, showing the instrument as arranged for loading.

The instrument is composed, mainly, of three parts—namely, an arm, A, handle B, jointed at *a* to the rear end of the arm A, and an arm, C, jointed at *b* to the handle B. The arm A is apertured at *d*, the aperture being of a size for receiving the body of the cartridge-shell S, and the handle B is formed with an anvil, *e*, in position for coming above the center of the apertured portion *d* of the main arm, so that when a shell is passed through the aperture at *d*, with its flange resting upon the upper side of the arm A, the primer or cap *m* can be forced into the usual cavity made for its reception in the base of the shell by means of the handle B and its anvil *e*, as illustrated in Fig. 1.

Upon the end of the arm C is a perforated or semicircular flange, *g*, provided with a groove, *n*, for receiving the rim of the shell, for the purpose of extracting the same from the gun.

Upon the end of the arm A is a pin, *h*, and the arm is also screw-threaded for receiving the hollow block *i*, which is used as a rammer when loading the shell, and also as a guide for the shell when decapping it.

For loading, the block *i* is screwed upon the arm A in the position shown in Fig. 4, in which position it covers the pin *h*.

The shell to be loaded is placed rim downward upon a table or other support, and the instrument is so held and applied as to enable the block *i* to force the charge down home within the shell.

For decapping, the shell is placed as shown in Fig. 3—that is, with its rim against the inner face of the flange *g*—and the handle B is then raised to force the cap out from the shell by the pin *h*, the block *i* in such operation being reversed upon the arm A, said block entering the shell, and serving as a guide to direct the pin *h* to the center.

For extracting the shell from the gun, the rim of the shell is placed in the groove *n* of the flange *g*, as shown by dotted lines in Fig. 2, and the instrument drawn bodily outward.

In Fig. 2 it will be seen that the walls of the flange part *g* are arcs of different circles, so that the shell, when placed with its rim as in Fig. 3, will be in proper central line with the decapper, and, as in Fig. 2, will correctly engage the rim of the shell to to be extracted.

Having thus fully described my invention, I claim as new and desire to secure by Letters Patent—

1. A cartridge-instrument consisting of the arm A, carrying the end pin and block *i*, the handle B, pivoted to a right-angled projection of arm A, and carrying the anvil *e* near its fulcrum, and the arm C, pivoted to said handle B, and having the perforated and grooved end flange, *g*, whereby it may be used for loading, capping, uncapping, and extracting the cartridge, as described.

2. The arm provided with a flange to engage the rim of the shell, the pivoted handle, and a rod connected therewith, and provided with the uncapping device, combined with the reversible loading device applied to the said rod and chambered at its end to cover the uncapping device, substantially as described.

EDMUND R. DARLING.

Witnesses:
GEORGE W. COOK,
BARTON L. DARLING.